United States Patent [19]

Mitsue et al.

[11] Patent Number: 4,516,783
[45] Date of Patent: May 14, 1985

[54] SEAL ASSEMBLY WITH RADIALLY OVERLAPPING SEAL MEANS

[75] Inventors: Naoki Mitsue; Hideki Takahashi, both of Fujisawa, Japan

[73] Assignee: Nippon Seiko K.K., Tokyo, Japan

[21] Appl. No.: 618,555

[22] Filed: Jun. 8, 1984

Related U.S. Application Data

[63] Continuation of Ser. No. 575,763, Feb. 1, 1984, abandoned.

[30] Foreign Application Priority Data

Feb. 12, 1983 [JP] Japan .................. 58-21842

[51] Int. Cl.³ .............. F16J 15/32; F16J 15/38; F16C 33/72
[52] U.S. Cl. .................. 277/50; 277/82; 277/84; 277/152; 277/166; 384/485; 384/486
[58] Field of Search ........... 277/42, 43, 47–50, 277/82, 84, 152, 153, 166; 308/187.1, 187.2

[56] References Cited

U.S. PATENT DOCUMENTS

| | | | |
|---|---|---|---|
| 3,306,223 | 2/1967 | Liebig | 277/82 X |
| 3,858,950 | 1/1975 | Otto | 308/187.1 |
| 4,043,620 | 8/1977 | Otto | 308/187.2 |
| 4,285,526 | 8/1981 | Klinteberg et al. | 277/153 |
| 4,428,586 | 1/1984 | Romero | 277/50 X |

FOREIGN PATENT DOCUMENTS

| | | | |
|---|---|---|---|
| 1139430 | 2/1957 | France | 277/153 |
| 2077371 | 12/1981 | United Kingdom | 277/152 |

*Primary Examiner*—Robert S. Ward
*Attorney, Agent, or Firm*—Fitzpatrick, Cella, Harper & Scinto

[57] ABSTRACT

A seal assembly for sealing a chamber formed between the radially inner and outer coaxial members spaced apart radially from each other and rotatable relative to each other comprises a first radial member extended radially inwardly from the outer member toward the outer periphery of the inner member, a second radial member disposed axially outside from the first radial member and extended radially outwardly from the inner member toward the outer member so that the first and second radial members may oppose to each other, a first seal means disposed between the tip end of the first radial member and the inner member, a second seal means disposed between a side surface of the first radial member and the second radial member, and a third seal means disposed between the outer member and the second radial member, the first, second and third seal means being so formed that leak of lubricant contained in the chamber may be permitted, while flow of foreign material from exterior may be prevented.

5 Claims, 7 Drawing Figures

SEAL ASSEMBLY WITH RADIALLY OVERLAPPING SEAL MEANS

This is a continuation of application Ser. No. 575,763, filed Feb. 1, 1984, now abandoned.

BACKGROUND OF THE INVENTION

1. Field of the Invention

This invention relates to a sealing device assembly disposed between two members rotatable relative to each other, particularly, two members one of which is rotatable and the other is fixed, such as the inner and outer races of an antifriction bearing, and more particularly to a sealing device assembly provided with at least three seal portions.

2. Description of the Prior Art

In mechanical apparatuses, there are known various types of sealing structure assemblies in which the space between a rotary shaft and a housing containing bearings associated with the rotary shaft or between members rotatable relative to each other such as the rings of individual antifriction bearings is reliably sealed by a method of continuously separating the apparatus into sealed chambers for the purpose of preventing leakage of lubricant from the apparatus or entry of dust or extraneous contaminants into the apparatus.

In an example of the prior art made from such a viewpoint (European patent application No. 0,051,170), as shown in FIG. 1 of the accompanying drawings, the sealing device assembly is designated by reference numeral 1 and is interposed between a rotary shaft 2 and a seat 3 formed on a housing 4 coaxially with the rotary shaft. The sealing device assembly 1 (FIG. 1) is comprised of a sealing ring 5 and a rigid shield member 6 fixed to the shaft 2. The sealing ring 5 has an annular support member 7 formed of a metal or other rigid material of high resistance, and a sealing member 8 made of a flexible and resiliently deformable material is secured to the support member 7.

The cross-section of the support member 7 is of an L-shape, and a first portion 9 thereof is parallel to the axis of the shaft and a second portion 10 thereof is perpendicular to the other portion and extends out radially relative to the axis of the shaft. On the other hand, the sealing member 8 includes a portion 11 which is parallel to the portion 10 of the member 7 and substantially flat. Two annular lips extend out from this portion 11. The first annular lip 12 extends out substantially in parallelism to the axis of the shaft 2 and moreover in a state inclined by a predetermined small angle in a direction away from the axis of the sealing member itself. On the other hand, the second annular lip 13 extends out from the base of the first lip 12 of the portion 11 in a predetermined slightly inclined state and in a direction substantially perpendicular to the axis of the sealing member itself. The end portions 14 and 15 of the two lips 12 and 13 are so formed as to be slidable on the surfaces 20 and 21, respectively, of the shield member 6. The shield member 6 is comprised of a sleeve portion 22 of a suitable thickness and a flange portion 23 perpendicular to the sleeve portion. The support member 7 can be fitted in the seat formed in the housing 4, against movement, and is coupled to the housing 4 by the portion 9 thereof.

The sealing device assembly 1 operates in the following manner.

The sealing ring 5 is fixed to the seat 3 formed on the housing 4 by the portion 9. Subsequently, the rigid shield member 6 is mounted by being pushed along the shaft 2 until the flange portion 23 becomes flush with the edge 16 of the portion 9. In this manner, the lips 12 and 13 are resiliently deformed and the end portions 14 and 15 thereof come into contact with the surface 20 of the flange portion 23 and the surface 21 of the sleeve portion 22, respectively.

The end portion 14 faces the environment, while the end portion 15 faces an interior chamber 17 defined by the seat 3 and the shaft 2. The lubricant which may leak from the annular chamber 17 meets the annular lip 13 which slides while being urged against the surface 21 of the sleeve portion 22 with a predetermined pressure. The end portion 15 of the lip 13 faces the interior of the interior chamber 17 and therefore, the stronger is the pushout force of the lubricant which tends to leak out, the greater is the sealing effect.

In contrast, extraneous contaminants which tend to enter the chamber 17 meet the annular lip 12 which slides while keeping contact with the surface 20 of the flange portion 23 with a predetermined pressure. The end portion 14 of the lip 12 faces the environment and therefore, in this case, the greater is the increase in the pressure with which the contaminants act on the sealing portion, the more is increased the pressure of contact between the surface 20 and the lip 12 and the more is increased the sealing effect.

The above-described prior art is effective in preventing the lubricant from leaking out from the interior of the mechanical apparatus and also preventing extraneous contaminants from entering the interior of the mechanical apparatus. However, if a contaminant such as muddy water from the outside adheres to the vicinity of the first annular lip 12, the contaminant will intervene between the lip 12 and the surface 20 to abrade the lip 12, thus expediting the entry of muddy water. Also, since the lips 12 and 13 face in said directions, the interior of the annular chamber surrounded by the lips 12, 13 and the shield member 6 assumes a negative pressure with respect to the ambience due to a temperature change and thus, the lips will be intensely urged against the sliding surface, thereby expediting abrasion of the lips.

Also, the provision of only two lips (lips 12 and 13) leads to an insufficient sealing effect in respect of both the prevention of leakage of the lubricant and the prevention of entry of contaminants.

SUMMARY OF THE INVENTION

The present invention has been made in view of the above-described situation and an object thereof is to eliminate the disadvantages peculiar to the prior art and to provide a sealing device assembly whose sealing effect is not injured by a contaminant such as muddy water which enters the mechanical apparatus from the outside thereof.

To achieve the above object, in the present invention, three annular lips are provided and these three lips may be resiliently deformed in a forward direction (the same direction as) with respect to the direction from the interior to the exterior to thereby rather permit lubricant to leak slightly, whereby the seal portion may be lubricated to prevent the lips from being abraded by muddy water or the like.

The invention will become more fully apparent from the following detailed description thereof taken in conjunction with the accompanying drawings.

DESCRIPTION OF THE PREFERRED EMBODIMENTS

Some embodiments of the present invention will hereinafter be described in detail by reference to FIGS. 2 to 6.

Figure 1:
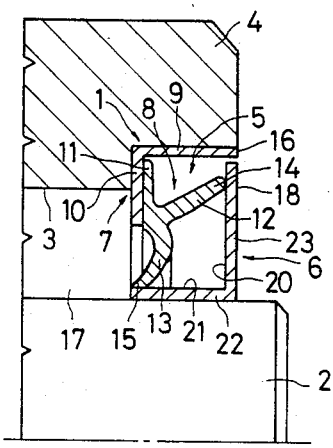
FIG. 1 is an assembled cross-sectional view showing an example of the prior art.
Figure 2:
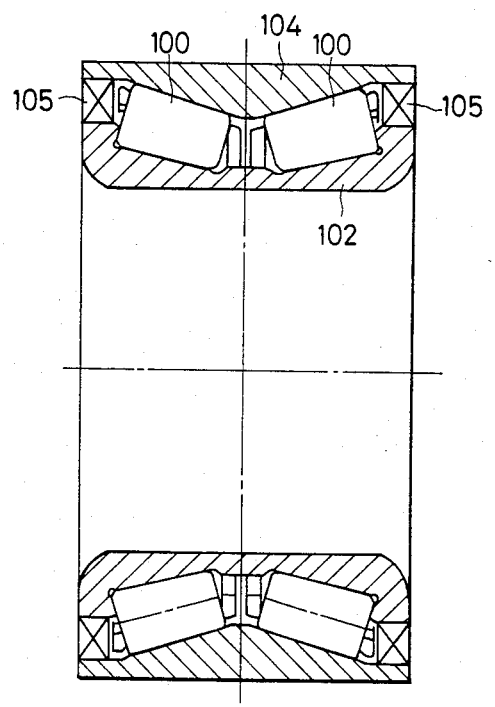
FIG. 2 is a cross-sectional view of a first embodiment of the present invention.
Figure 3A:
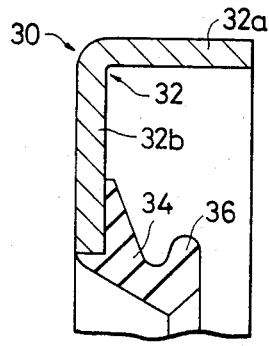
FIGS. 3A and 3B are exploded perspective views of the first embodiment.
Figure 3B:
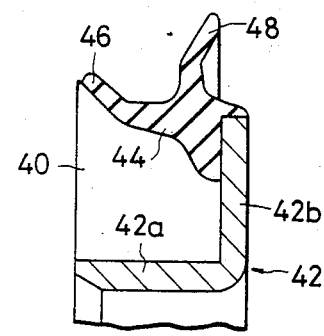
Figure 4:
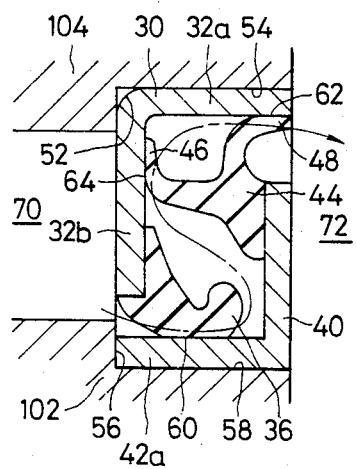
FIG. 4 is an assembled cross-sectional view of the first embodiment.

FIGS. 2 to 4 show a first embodiment of the present invention applied to double row bearings suitable as the bearings for the rear wheels of an automotive vehicle of the independent suspension type. A double row bearing has an inner race 102 and an outer race 104 radially spaced apart from each other through rolling members 100, rotatable relative to each other and disposed concentrically with each other. Sealing devices 105 according to the present invention which will hereinafter be described in detail are provided radially between the inner race 102 and the outer race 104 and the axial opposite end positions.

As shown in FIGS. 3A and 3B, the sealing device assembly is comprised of a first annular element 30 comprising a first sealing member 34 secured to a first support member 32 which in turn is secured to the outer race 104 as will later be described, and a second annular element 40 comprising a second sealing member 44 secured to a second support member 42 which in turn is secured to the inner race 102. The first support member 32 is formed of a suitable metal and has an axially extending first portion 32a and a second portion 32b extending in a direction perpendicular thereto at the axial inner side. The first sealing member 34 provided with a lip 36 formed of rubber or the like and extending radially inwardly and axially outwardly is attached to the inner peripheral side of the second portion 32b. On the other hand, the second support member 42 likewise has an axially extending first portion 42a and a second portion 42b extending perpendicularly thereto at the axial outer side. The second sealing member 44 provided with two bifurcated lips 46 and 48 formed of rubber or the like is outwardly attached to the outer peripheral side of the second portion 42b. The lip 46 extends less radially outwardly and more axially inwardly than the lip 48.

To mount the sealing device assembly, as shown in FIG. 4, the first annular element 30 is inserted into a seat 54 until it bears against the stepped portion 52 of the outer race 104 of the bearing, and then the second annular element 40 is inserted into a seat 58 until it bears against the stepped portion 56 of the inner race 102 of the bearing. When the second annular element 40 is inserted, the lip 36 of the first sealing member 34 comes into contact with the inner peripheral surface of the first portion 42a of the second support member 42 and is resiliently deformed in the direction opposite to the direction of insertion (rightwardly as viewed in FIG. 4), thereby forming a first radial seal portion 60. Also, the lip 48 of the second sealing member 44 comes into contact with the inner peripheral surface of the cylindrical first portion 32a of the first annular element 30 and is resiliently deformed in the same direction, thereby forming a second radial seal portion 62. The lip 46 of the second sealing member 44 comes into contact with the axial outer surface of the radially extending second portion 32b of the first annular element 30 at the final stage of the insertion and is resiliently deformed, thereby forming an end face seal portion 64.

Description will now be made of the operation of the sealing device assembly assembled in the manner as described above. The lubricant in an interior chamber 70 formed between the inner and outer races is not completely prevented from leaking by the first and second radial seal portions 60 and 62 and the end face seal portion 64, but rather these seal portions permit leakage of the lubricant to the outside. This is because, relative to the direction of leakage of the lubricant indicated by dot-and-dash line, the lips 36, 46 and 48 are resiliently deformed in a forward direction.

On the other hand, said direction in which the lips 36, 46 and 48 face is opposite to the direction of entry of muddy water or the like which tends to enter the chamber 70 from the outside 72 (the direction opposite to said dot-and-dash line) and therefore, entry of muddy water or the like is well prevented. The muddy water is considerably cleaned by passing through the second radial seal portion 62 and, when it has passed through the end face seal portion 64, almost all of the mud, sand, etc. are eliminated therefrom. Moreover, the lubricant leaks into both the radial seal portions 60, 62 and the end face seal portion 64 and therefore, the surface of the first support member 32 is scarcely injured by the sand or the like collected in these portions.

Figure 5:
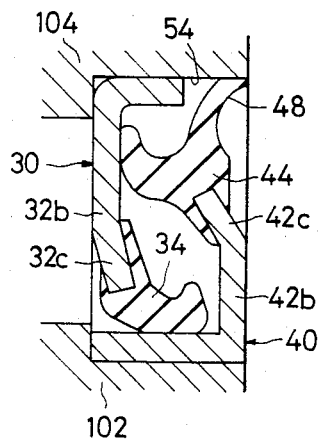
FIGS. 5 and 6 are assembled cross-sectional views showing the essential portions of second and third embodiments, respectively, of the present invention.

A second embodiment of the present invention will now be described by reference to FIG. 5 in which, for simplicity, portions corresponding to those of the above-described embodiment are given similar reference numerals. The differences of the second embodiment from the first embodiment will be described chiefly. A difference of this embodiment from the above-described embodiment is that the axial width of the annular elements 30 and 40 is made narrower to make the entire device compact. For this reason, the lip 48 of the second sealing member 44 of the second annular element 40 is made relatively long and moreover extends axially outwardly (rightwardly as viewed in FIG. 5). The lip 48 is in direct contact not with the support member 32 of the first annular element 30 but with a seat 54 formed on the inner periphery of the outer race 104.

Also, third portions 32c and 42c somewhat inclined so as to face each other are provided in continuation to the radially extending second portions 32b and 42b of the first and second support members 32 and 42, and sealing members 34 and 44 are secured to the third portions.

Figure 6:
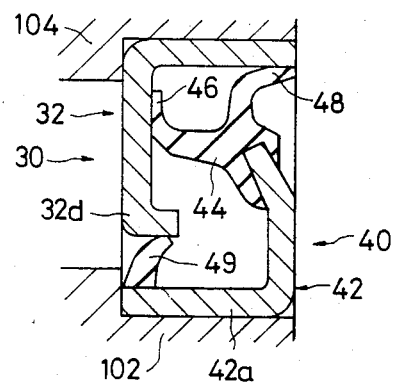

In the above-described two embodiments, the three lips 36, 46 and 48 are formed so as to provide one or two lips for the first or second annular element 30 or 40, but doing so is not indispensable. As shown in FIG. 6 which shows a third embodiment, another lip 49 in addition to the sealing member 44 may be secured to the support member 42 of the second annular element 40 and may be brought into contact with the inner peripheral side of the right-angle bent portion 32d of the support member 32 and no sealing member may be provided on the support member 32 of the first annular element 30. The lip 49 secured to the first portion 42a of the second support member 42 is of course formed so as to be in a forward direction relative to the direction of leakage of lubricant.

The mechanical apparatuses to be sealed include various ones in addition to bearings, and the present invention is widely applicable to these.

According to the present invention, as described above in detail, the sealing device assembly has at least two radial seal portions and at least one end face seal portion and moreover, any of these three seal portions is formed so as to face the outside from the interior of the mechanical apparatus. That is, some amount of the interior lubricant can leak out toward the outside and thus, the above-mentioned seal portions are lubricated by the lubricant which has leaked out, and this leads to the effect that the seal portions are not damaged by extraneous contaminants.

We claim:

1. A seal assembly for sealing a chamber formed between radially inner and outer members disposed coaxially and spaced apart radially from each other, the members being rotatably relative to each other, the seal assembly comprising:

a first radial member extended radially inwardly from the outer member toward the outer periphery of the inner member, a second radial member disposed axially outside from the first radial member and extended radially outwardly from the inner member toward the outer member so that the first and second radial members may oppose to each other, a first seal means disposed between the tip end of the first radial member and the inner member, a second seal means disposed between a side surface of the first radial member and the second radial member, a third seal means disposed between the outer member and the second radial member, and the first, second and third seal means being so formed that leak of lubricant contained in the chamber may be permitted, while flow of foreign material from exterior may be prevented.

2. A seal assembly for sealing a chamber formed between radially inner and outer members disposed coaxially and spaced apart radially from each other, the members being rotatably relative to each other, the seal assembly comprising:

a first radial member extended radially inwardly from the outer member toward the outer periphery of the inner member, a second radial member disposed axially outside from the first radial member and extended radially outwardly from the inner member toward the outer member so that the first and second radial members may oppose to each other, a first seal means disposed between the tip end of the first radial member and the inner member, to form a first seal, a second seal means including a resilient seal member secured to the second radial member, the seal member being bifurcated to form a first end which is in contact with a side surface of the first radial member to form a second seal and a second end which forms a third seal between an inner periphery of the outer member and the second end, the first, second and third seal means being so formed that leak of lubricant contained in the chamber may be permitted, while flow of foreign material from exterior may be prevented.

3. A bearing assembly comprising an inner race member:

an outer race member concentrically arranged with the inner race member to form an annular chamber between the inner race member and the outer race member, rolling elements disposed between the inner race member and the outer race member in the chamber so that the inner race member and outer race member may rotate relative to each other, means for sealing the chamber, the sealing means includes a first radial member extended radially inwardly from the outer race toward the outer periphery of the inner member, a second radial member disposed axially outside from the first radial member and extended radially outwardly from the inner race toward the outer race so that the first and second radial members may oppose to each other, a first resilient seal member disposed between the tip end of the first radial member and the inner member to form a first seal, a second resilient seal member secured to the second radial member and bifurcated to form a first seal element which is in contact with a side surface of the first radial member to form a second seal and a second seal element which is in contact with the outer race member to form a third seal, the first, second and third seal being so formed that leak of lubricant contained in the chamber may be permitted, while flow of foreign material from exterior may be prevented.

4. A seal assembly for sealing a chamber formed between radially inner and outer members disposed coaxially and spaced apart radially from each other, the members being rotatable relative to each other, the seal assembly comprising:

a first radial member extended radially inwardly from the outer member toward the outer periphery of the inner member, a second radial member disposed axially outwardly from the first radial member and extended radially outwardly from the inner member toward the outer member so that the first and second radial members may oppose each other, first seal means disposed between the tip end of the first radial member and the inner member, second seal means disposed between a side surface of the first radial member and the second radial member, and third seal means disposed between the outer member and the second radial member.

5. A seal assembly according to claim 4, wherein said second and third seal means are so formed that leak of lubricant contained in the chamber may be permitted, while flow of foreign material from exterior may be prevented.

* * * * *

REEXAMINATION CERTIFICATE (2348th)
United States Patent [19]
Mitsue et al.

[11] B1 4,516,783
[45] Certificate Issued Aug. 2, 1994

[54] SEAL ASSEMBLY WITH RADIALLY OVERLAPPING SEAL

[75] Inventors: Naoki Mitsue; Hideki Takahashi, both of Fujisawa, Japan

[73] Assignee: Nippon Seiko Kabushiki Kaisha, Tokyo, Japan

Reexamination Request:
No. 90/003,075, May 27, 1993

Reexamination Certificate for:
Patent No.: 4,516,783
Issued: May 14, 1985
Appl. No.: 618,555
Filed: Jun. 8, 1984

Related U.S. Application Data

[63] Continuation of Ser. No. 575,763, Feb. 1, 1984, abandoned.

[30] Foreign Application Priority Data

Feb. 12, 1983 [JP] Japan ................... 58-21842

[51] Int. Cl.⁵ ............... F16J 15/32; F16J 15/38; F16C 33/72
[52] U.S. Cl. .......................... 277/50; 277/82; 277/84; 277/152; 277/166; 384/485; 384/486
[58] Field of Search ................... 277/152, 35, 37, 38, 277/50, 82, 84, 166; 384/485, 486

[56] References Cited

U.S. PATENT DOCUMENTS

| | | |
|---|---|---|
| 3,021,161 | 2/1962 | Rhoads et al. |
| 3,028,203 | 4/1962 | Lund et al. .......................... 277/37 |
| 4,185,838 | 1/1980 | Danner |
| 4,345,770 | 8/1982 | Seeh .......................... 277/152 |
| 4,434,985 | 3/1984 | Sonnerat |
| 4,516,783 | 5/1985 | Mitsue et al. |

FOREIGN PATENT DOCUMENTS 2505951 11/1982 France .

*Primary Examiner*—William A. Cuchlinski, Jr.
*Assistant Examiner*—Daniel G. DePumpo

[57] ABSTRACT

A seal assembly for sealing a chamber formed between the radially inner and outer coaxial members spaced apart radially from each other and rotatable relative to each other comprises a first radial member extended radially inwardly from the outer member toward the outer periphery of the inner member, a second radial member disposed axially outside from the first radial member and extended radially outwardly from the inner member toward the outer member so that the first and second radial members may oppose to each other, a first seal means disposed between the tip end of the first radial member and the inner member, a second seal means disposed between a side surface of the first radial member and the second radial member, and a third seal means disposed between the outer member and the second radial member, the first, second and third seal means being so formed that leak of lubricant contained in the chamber may be permitted, while flow of foreign material from exterior may be prevented.

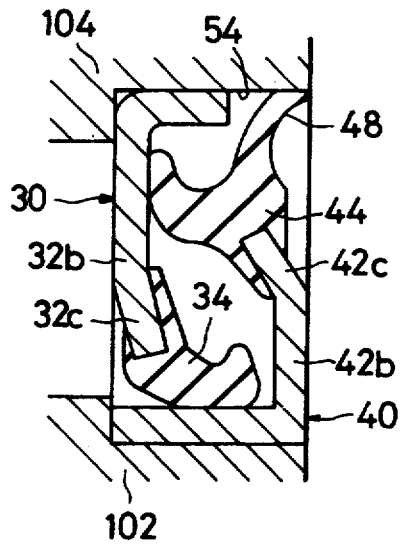

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 2 and 3 is confirmed.

Claims 4 and 5 are cancelled.

Claim 1 is determined to be patentable as amended.

New claims 6-9 and 10 are added and determined to be patentable.

1. A seal assembly for sealing a chamber formed between radially inner and outer members disposed coaxially and spaced apart radially from each other, the members being [rotatably] *rotatable* relative to each other *and defining an interior portion therebetween*, the seal assembly comprising:
   a first radial member extended radially inwardly from the outer member toward the outer periphery of the inner member,
   a second radial member disposed axially outside from the first radial member and extended radially outwardly from the inner member toward the outer member so that the first and second radial members may oppose [to] each other, *with the second radial member extending in a plane between the interior portion and an exterior portion and having a contiguous axial portion extending in the axial direction,*
   a first seal means disposed between [the] *a* tip end of the first radial member and the inner member, *the first seal means contacting the tip end and the axial portion of the second radial member,*
   a second seal means disposed between a side surface of the first radial member and the second radial member, *with the second seal means secured to the second radial member and extending into contact with the side surface of the first radial member,*
   a third seal means disposed between the outer member and the second radial member, *said third seal means secured to the second radial member and extending toward an inner periphery of the outer member,* and
   *the first, second and third seal means each including a resilient seal member with a tip end curved toward the exterior portion of the chamber such that* the first, second and third seal means [being so formed that] *permit* leak of lubricant contained in the chamber [may be permitted,] *to the exterior portion* while *preventing* flow of foreign material from *the* exterior [may be prevented] *portion.*

6. *A seal assembly according to claim 1, wherein the third seal means is secured to one end of the second radial member.*

7. *A seal assembly according to claim 1, wherein the first seal means is secured to the tip end of the first radial member.*

8. *A seal assembly according to claim 1, wherein the first seal means is secured to the second radial member.*

9. *A seal assembly according to claim 1, wherein a tip end of the third seal member contacts the outer member.*

10. *A seal assembly according to claim 1, wherein the first radial member has a contiguous axial portion extending in the axial direction, and the third seal means contacts the axial portion of the first radial member.*

* * * * *